(12) United States Patent
Li et al.

(10) Patent No.: US 10,822,484 B2
(45) Date of Patent: Nov. 3, 2020

(54) POLYMER COMPOSITIONS WITH REDUCED VOLATILES

(71) Applicant: ExxonMobil Chemical Patents Inc., Baytown, TX (US)

(72) Inventors: Na Li, Shanghai (CN); Wei Hu, Shanghai (CN); Joseph G. M. Flendrig, The Netherlands (NL); Machteld M. Mertens, Boortmeerbeek (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 133 days.

(21) Appl. No.: 16/021,099

(22) Filed: Jun. 28, 2018

(65) Prior Publication Data

US 2019/0055387 A1 Feb. 21, 2019

Related U.S. Application Data

(60) Provisional application No. 62/546,199, filed on Aug. 16, 2017.

(51) Int. Cl.
| | | |
|---|---|---|
| *C08L 23/14* | (2006.01) | |
| *C08L 23/08* | (2006.01) | |
| *B01D 15/20* | (2006.01) | |
| *B01J 29/40* | (2006.01) | |

(52) U.S. Cl.
CPC ............. *C08L 23/14* (2013.01); *B01D 15/20* (2013.01); *B01J 29/40* (2013.01); *C08L 23/08* (2013.01); *B01D 2257/708* (2013.01)

(58) Field of Classification Search
CPC ............ C08L 23/08; B01D 15/20; B01J 29/40
USPC ........................................ 523/218; 524/450
See application file for complete search history.

(56) References Cited

U.S. PATENT DOCUMENTS

| | | | |
|---|---|---|---|
| 4,833,181 A | 5/1989 | Narukawa et al. | |
| 2014/0360579 A1* | 12/2014 | Yoda ................... | H01L 31/0481 136/259 |

FOREIGN PATENT DOCUMENTS

| | | |
|---|---|---|
| WO | 2012/024626 | 2/2012 |
| WO | 2013/096705 | 6/2013 |

OTHER PUBLICATIONS

Xi, J., et al. "PPVDF-PEO/ZSM-5 based composite microporous polymer electrolyte with novel pore configuration and ionic conductivity", Solid State Ionics, vol. 177, No. 7-8, pp. 709-713, 2006.
Aziz, A., et al. "Adsorptive Volatile Organic Removal from Air onto NaZSM-5 and HZSM-5: Kinetic and Equilibrium Studies", Water, Air & Soil Pollution, vol. 228, No. 9, pp. 1-11, 2017.

* cited by examiner

*Primary Examiner* — Edward J Cain

(57) ABSTRACT

Described herein are polymer compositions comprising a polymer and a molecular sieve having a framework type of AEL, AFO, EUO, FER, HEU, MEL, MTW, MTT, MFI, OFF, or TON. The present polymer composition comprises a toluene content of less than 1.0 mg/m$^3$ and a $C_6$-$C_{16}$ volatile organic compounds content of less than 3.0 mg/m$^3$. Described herein also are a method of reducing the toluene content contained in polymers.

24 Claims, No Drawings

POLYMER COMPOSITIONS WITH REDUCED VOLATILES

CROSS-REFERENCE OF RELATED APPLICATION

This application claims the benefit of Provisional Application No. 62/546,199, filed Aug. 16, 2017, the disclosures of which is incorporated herein by reference.

FIELD OF THE INVENTION

This invention relates to compositions comprising a polymer and a molecular sieve, in particular to compositions having a low content of volatile organic compounds ("VOC").

BACKGROUND OF THE INVENTION

Polyolefin-based polymers, such as propylene-based and ethylene-based polymers, plastic or elastic, are widely used in automobile industries, for example, in interior components such as carpets, plastic dashboard parts, roof felting, and seats as well as adhesives used in decorations.

However, volatiles of organic compounds, such as benzene, toluene, and aldehydes can be present in such polymers resulting from solvents used in liquid slurry or solution polymerizations or resulting from byproducts. For example, when single site catalysts, such as metallocene catalysts, are used as catalyst, an aromatic catalyst solvent, such as toluene may have to be used. This in turn complicates solvent separation to prevent toluene build up in the reactor, result into residents of aromatic compounds and lead to environmental issues. Thus, a finishing section of such preparation may comprise a vacuum devolatilizer, in which the molten polymer is exposed to a vacuum while being intensively agitated to draw off volatiles such as solvent and residual monomer, in order to reduce the level of volatiles in the finished polymer.

It is therefore a need to reduce VOCs from polymer material used in a variety of applications, for example in passenger car components and other applications.

SUMMARY OF THE INVENTION

The present invention provides a composition that comprises a polymer and a molecular sieve having a framework type of AEL, MFI, MFS, MEL, MTW, EUO, MTT, HEU, FER, OFF, or TON, wherein the composition comprises a toluene content of less than 1.0 mg/m$^3$ and, preferably, is at least 50%, more preferably 80%, lower than a reference toluene content contained in a reference composition that is the same as the composition but substantially free of the molecular sieve; and the composition comprises a $C_6$-$C_{16}$ volatile organic compound content of less than 3.0 mg/m$^3$, the toluene content, the reference toluene content, and the $C_6$-$C_{16}$ volatile organic compound content are measured by thermodesorption gas chromatography with mass spectrometric detection method.

The present invention also provides a composition that comprises a polymer and a molecular sieve, wherein the composition comprises a toluene content of less than 1.0 mg/m$^3$ and is at least 50%, more preferably 80%, lower than a reference toluene content contained in a reference composition that is the same as the composition but substantially free of the molecular sieve; and the composition comprises a $C_6$-$C_{16}$ volatile organic compound content of less than 3.0 mg/m$^3$.

In some embodiments, the polymer composition further comprises at least one of:

(a) a toluene contents of less than about 0.5 mg/m$^3$, or less than about 0.1 mg/m$^3$;

(b) has a toluene content that is at least 80% lower than a reference toluene content contained in a reference composition that has the same compositions but substantially free of the molecular sieve;

(c) a $C_6$-$C_{16}$ volatile organic compounds content of less than about 2.5 mg/m$^3$, or less than about 1.0 mg/m$^3$;

(d) a cumulative content of benzene, toluene, xylene, ethylbenzene, and styrene of less than about 0.2 mg/m$^3$, or less than about 0.15 mg/m$^3$, as measured by high-performance liquid chromatography with diode-array detection method;

(e) a cumulative content of formaldehyde, acetaldehyde and acrolein of less than about 0.15 mg/m$^3$, or less than about 0.1 mg/m$^3$; or (f) a cumulative content of benzene, toluene, xylene, ethylbenzene, styrene, formaldehyde, acetaldehyde and acrolein of less than about 0.35 mg/m$^3$, or less than about 0.20 mg/m$^3$.

In some embodiments, the polymer composition may comprises from about 0.5 to about 20 wt %, or from about 1.5 to about 15 wt % the molecular sieve based on the weight of the polymer composition.

In some embodiments, the molecular sieve comprises at least one of ZSM-5, ZSM-12, ZSM-22, ZSM-23, ZSM-34, ZSM-35, ZSM-38, ZSM-48, and ZSM-50, preferably ZSM-5, and in the same or other embodiments, the molecular sieves has a $SiO_2/Al_2O_3$ molar ratio of less than about 150, or less than about 100, or less than about 50.

In another aspect, the present invention provides an article comprising the present compositions.

In a further aspect, the present invention provides a method of reducing volatiles and/or toluene from a composition comprising a polymer by blending the composition with a molecular sieve useful in the present polymer composition, such as those having a framework type of AEL, MFI, MFS, MEL, MTW, EUO, MTT, HEU, FER, OFF, or TON to form a blended composition, wherein the toluene content of the blended composition is at least 50%, or at least 80% lower than a reference toluene content of the polymer composition, the toluene content and the reference toluene content are determined by thermodesorption gas chromatography with mass spectrometric detection method.

DETAILED DESCRIPTION OF THE INVENTION

The term "polymer" as used herein includes, but is not limited to, homopolymers, copolymers, terpolymers, etc., and alloys and blends thereof. The term "polymer" as used herein also includes impact, block, graft, random, and alternating copolymers. As used herein, the term "copolymer" is meant to include polymers having two or more monomers, optionally, with other monomers, and may refer to interpolymers, terpolymers, etc. The term "polymer" shall further include all possible geometrical configurations unless otherwise specifically stated. Such configurations may include isotactic, syndiotactic and random symmetries. The term "composition" as used herein refers to a mixture of two or more material.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Propylene-based polymer" as used herein, includes homopolymers and copolymers of propylene or mixtures thereof that comprises at least 50 wt % of the propylene-derived units. Products that include one or more propylene monomers polymerized with one or more comonomers may be commonly known as random copolymers (RCP) or impact copolymers (ICP). "Ethylene-based polymer" as used herein, includes homopolymers and copolymers of ethylene or mixtures thereof that comprises at least 50 wt % of the ethylene-derived units.

"Reactor blend," as used herein, means a highly dispersed and mechanically inseparable blend of two or more polymers produced in situ. For example, a reactor blend polymer may be the result of a sequential (or series) polymerization process where a first polymer component is produced in a first reactor and a second polymer component is produced in a second reactor in the presence of the first polymer component. Alternatively, a reactor blend polymer may be the result of a parallel polymerization process where the polymerization effluent containing the polymer components made in separate parallel reactors are solution blended to form the final polymer product. Reactor blends may be produced in a single reactor, a series of reactors, or parallel reactors and are reactor blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

"Catalyst system," as used herein, means the combination of one or more catalysts with one or more activators and, optionally, one or more support compositions. An "activator" is any compound or component, or combination of compounds or components, capable of enhancing the ability of one or more catalysts to polymerize monomers to polymers.

"Metallocene" is herein defined to contain one or more cyclopentadienyl moiety in combination with a transition metal of the Periodic Table of Elements.

The present invention discloses compositions comprising a polymer and a molecular sieve having an AEL, MFI, MFS, MEL, MTW, EUO, MTT, HEU, FER, OFF, or TON framework type, preferably MFI-type framework. The composition has a toluene content of less than 1.0 mg/m$^3$ and a $C_6$-$C_{16}$ volatile organic compounds content of less than 5.0 mg/m$^3$, measured by TDS-GC-MS method.

In some embodiment the polymer material may have a toluene content of greater than about 0.1 mg/m$^3$, or greater than about 0.2 mg/m$^3$, or greater than 0.5 mg/m$^3$, or greater than 1.0 mg/m$^3$. In the same or other embodiments, the polymer material may have $C_6$-$C_{16}$ volatile organic compounds of greater than about 1.0 mg/m$^3$, or greater than about 2.0 mg/m$^3$, or greater than about 3.0 mg/m$^3$, or greater than about 4.0 mg/m$^3$, or greater than about 5.0 mg/m$^3$. In the same or other embodiments, the polymer material may have $C_1$-$C_{16}$ volatile organic compounds of greater than about 1.0 mg/m$^3$, or greater than about 2.0 mg/m$^3$, or greater than about 3.0 mg/m$^3$, or greater than about 4.0 mg/m$^3$, or greater than about 5.0 mg/m$^3$. The term "volatile organic compound" ("VOC") shall mean an organic compound that has a boiling point of less than 260° C. and a saturated vapor pressure of 133.32 Pa or more at room temperature (23±2° C.) and can present in the air in its vapor phase at normal temperature (25±2° C.). The term "$C_6$-$C_{16}$ volatile organic compounds" shall mean VOCs containing 6-16 carbon atoms, including but are not limited to, benzene, toluene, ethylbenzene, xylene, and styrene; and the term $C_1$-$C_{16}$ volatile organic compounds shall mean VOCs containing 1-16 carbon atoms, including but are not limited to, benzene, toluene, ethylbenzene, xylene, styrene, formaldehyde, acetaldehyde, and acrolein.

Useful polymers of the present composition can be prepared by slurry or solution polymerization of one or more α-olefin monomers. In one embodiment, the polymer can be prepared by continuous solution polymerization using a metallocene catalyst dissolved in an organic solvent, such as aromatic solvents, for example benzene, toluene, ethylbenzene, xylene, styrene, and cyclohexane. Illustrative polymers of the present invention comprises propylene-based copolymers, ethylene-based copolymers. However, one of ordinary skills in the art will understand that polymers suitable for the present compositions are not limited to propylene-based and ethylene-based polymers, which will be described herein below.

Propylene-Based Polymer ("PBP")

The present compositions may comprise one or more propylene-based polymers ("PBPs"). In some embodiments, the PBPs comprises propylene and from less than about 50 wt %, for example from about 1 to about 30 wt %, or about 3 to about 25 wt % of one or more comonomers selected from ethylene and/or $C_4$-$C_{12}$ α-olefins. The α-olefin comonomer units may be derived from ethylene, butene, pentene, hexene, 4-methyl-1-pentene, octene, or decene. In preferred embodiments the α-olefin is ethylene and butene. In some embodiments, the propylene-based polymer consists essentially of propylene and ethylene, or consists only of propylene and ethylene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

In one or more embodiments, the PBP may comprise from about 3 wt % to about 25 wt % ethylene-derived units, or from about 7 wt % to about 20 wt % ethylene, or from about 9 wt % to about 18 wt % ethylene-derived units, where the percentage by weight is based upon the total weight of the PBP. In the same or different embodiments, the PBP may comprise from about 75 wt % to about 97 wt % propylene-derived units, or from about 80 wt % to about 93 wt % propylene-derived units, or from about 82 wt % to about 91 wt % propylene-derived units, where the percentage by weight is based upon the total weight of the PBP.

The PBPs in one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. The Tm of the PBP (as determined by DSC) may be less than about 115° C., or less than about 110° C., or less than about 100° C., or less than about 95° C., or less than about 90° C. In some embodiments, the PBP may have two melting peaks as determined by DSC. In other embodiments, the PBP may have a single melting peak as determined by DSC.

The PBP may be characterized by its heat of fusion (Hf), as determined by DSC. The PBP may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. The PBP may be characterized by an Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g, or less than 25 J/g.

As used within this specification, DSC procedures for determining Tm and Hf include the following. From about 6 mg to about 10 mg of a sheet of the polymer pressed at approximately 200° C. to 230° C. is removed with a punch die. This is annealed at room temperature for at least 2 weeks. As used herein, the term "room temperature" is used to refer to the temperature range of about 20° C. to about 23.5° C. At the end of this period, the sample is placed in a Differential Scanning Calorimeter (TA Instruments Model 2920 DSC) and cooled to about −50° C. to about −70° C. at a cooling rate of about 10° C./min. The sample is heated at 10° C./min to attain a final temperature of about 200° C. to about 220° C. The thermal output is recorded as the area under the melting peak of the sample which is typically peaked at about 30° C. to about 175° C. and occurs between the temperatures of about 0° C. and about 200° C. is a measure of the heat of fusion expressed in Joules per gram of polymer. The melting point is recorded as the temperature of the greatest heat absorption within the range of melting of the sample.

The PBP can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, or from about 80 to about 99%, or from about 85 to about 99%, or from about 90 to about 99%, or from about 90 to about 97%, or from about 80 to about 97%, where desirable ranges may include ranges from any lower limit to any upper limit. Triad tacticity is determined by the methods described in U.S. Pat. No. 7,232,871.

The PBP may have a tacticity index m/r ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, is calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The PBP may have a % crystallinity of from about 0.5% to about 40%, or from about 1% to about 30%, or from about 5% to about 25%, where desirable ranges may include ranges from any lower limit to any upper limit, determined according to DSC procedures. Crystallinity may be determined by dividing the Hf of a sample by the Hf of a 100% crystalline polymer, which is assumed to be 189 J/g for isotactic polypropylene or 350 J/g for polyethylene.

The PBP may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature, as measured per the ASTM D-792 test method, where desirable ranges may include ranges from any lower limit to any upper limit.

The PBP can have a melt index (MI) (ASTM D-1238, 2.16 kg @ 190° C.), of less than or equal to about 100 g/10 min, or less than or equal to about 50 g/10 min, or less than or equal to about 25 g/10 min, or less than or equal to about 10 g/10 min, or less than or equal to about 9.0 g/10 min, or less than or equal to about 8.0 g/10 min, or less than or equal to about 7.0 g/10 min.

The PBP may have a melt flow rate (MFR), as measured according to ASTM D-1238 (2.16 kg weight @ 230° C.), greater than about 1 g/10 min, or greater than about 2 g/10 min, or greater than about 5 g/10 min, or greater than about 8 g/10 min, or greater than about 10 g/10 min. The PBP may have an MFR less than about 500 g/10 min, or less than about 400 g/10 min, or less than about 300 g/10 min, or less than about 200 g/10 min, or less than about 100 g/10 min, or less than about 75 g/10 min, or less than about 50 g/10 min. In some embodiments, the PBP may have an MFR at least about 8 g/10 min, or at least about 10 g/10 min, for example from about 8 to about 100 g/10 min, or from about 10 to about 75 g/10 min, or from about 15 to about 50 g/10 min, or from about 15 to about 30 g/10 min.

The PBP may have a weight average molecular weight (Mw) of from about 50,000 to about 5,000,000 g/mol, or from about 75,000 to about 1,000,000 g/mol, or from about 100,000 to about 500,000 g/mol, or from about 125,000 to about 300,000 g/mol, where desirable ranges may include ranges from any lower limit to any upper limit.

The PBP may have a number average molecular weight (Mn) of from about 2,500 to about 2,500,000 g/mole, or from about 5,000 to about 500,000 g/mole, or from about 10,000 to about 250,000 g/mole, or from about 25,000 to about 200,000 g/mole, where desirable ranges may include ranges from any lower limit to any upper limit.

The PBP may have a Z-average molecular weight (Mz) of from about 10,000 to about 7,000,000 g/mole, or from about 50,000 to about 1,000,000 g/mole, or from about 80,000 to about 700,000 g/mole, or from about 100,000 to about 500,000 g/mole, where desirable ranges may include ranges from any lower limit to any upper limit.

The molecular weight distribution (MWD, equal to Mw/Mn) of the PBP may be from about 1 to about 40, or from about 1 to about 15, or from about 1.8 to about 5, or from about 1.8 to about 3, where desirable ranges may include ranges from any lower limit to any upper limit.

Optionally, the PBPs may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). Exemplary dienes include, but are not limited to, butadiene, pentadiene, hexadiene (e.g., 1,4-hexadiene), heptadiene (e.g., 1,6-heptadiene), octadiene (e.g., 1,6-octadiene, or 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of branched chain acyclic dienes include, but are not limited to, 5-methyl-1,4-hexadiene, 3,7-dimethyl-1,6-octadiene, and 3,7-dimethyl-1,7-octadiene. Examples of single ring alicyclic dienes include, but are not limited to, 1,4-cyclohexadiene, 1,5-cyclooctadiene, and 1,7-cyclododecadiene. Examples of multi-ring alicyclic fused and bridged ring dienes include, but are not limited to, tetrahydroindene; norbornadiene; methyltetrahydroindene; dicyclopentadiene; bicyclo(2.2.1) hepta-2,5-diene; and alkenyl-, alkylidene-, cycloalkenyl-, and cylcoalkylidene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to, vinyl cyclohexene, allyl cyclohexene, vinylcyclooctene, 4-vinylcyclohexene, allyl cyclodecene, vinylcyclododecene, and tetracyclododecadiene. In some embodiments of the present invention, the diene is selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based polymer comprises a diene, the diene may be present at from 0.05 wt % to about 6 wt % diene-derived units, or from about 0.1 wt % to about 5.0 wt % diene-derived units, or from about 0.25 wt % to about 3.0 wt % diene-derived units, or from about 0.5 wt % to about 1.5 wt % diene-derived units, where the percentage by weight is based upon the total weight of the propylene-derived, α-olefin derived, and diene-derived units.

In one or more embodiments, the PBP can optionally be grafted (i.e., "functionalized") using one or more grafting monomers. As used herein, the term "grafting" denotes covalent bonding of the grafting monomer to a polymer chain of the PBP. The grafting monomer can be or include at least one ethylenically unsaturated carboxylic acid or acid derivative, such as an acid anhydride, ester, salt, amide, imide, acrylates, or the like. Illustrative monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxylethyl methacrylate and higher hydroxy-alkyl methacrylates and glycidyl methacrylate. Maleic anhydride is a preferred grafting monomer. In one or more embodiments, the grafted PBP comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment, wherein the graft monomer is maleic anhydride, the maleic anhydride concentration in the grafted polymer is preferably in the range of about 1 to about 6 wt %, preferably at least about 0.5 wt %, and highly preferably about 1.5 wt %.

In some embodiments, the PBP is a reactor blend of a first polymer component and a second polymer component. Thus, the comonomer content of the PBP can be adjusted by adjusting the comonomer content of the first polymer component, adjusting the comonomer content of second polymer component, and/or adjusting the ratio of the first polymer component to the second polymer component present in the propylene-based polymer. In such embodiments, the first polymer component may comprise propylene and ethylene and have an ethylene content of greater than 10 wt % ethylene, or greater than 12 wt % ethylene, or greater than 13 wt % ethylene, or greater than 14 wt % ethylene, or greater than 15 wt % ethylene, and an ethylene content that is less than 20 wt % ethylene, or less than 19 wt % ethylene, or less than 18 wt % ethylene, or less than 17 wt % ethylene, or less than 16 wt % ethylene, where the percentage by weight is based upon the total weight of the propylene-derived and ethylene derived units of the first polymer component. In such embodiments, the second polymer component may comprise propylene and ethylene and have an ethylene content of greater than 2 wt % ethylene, or greater than 3 wt % ethylene, or greater than 4 wt % ethylene, or greater than 5 wt % ethylene, or greater than 6 wt % ethylene, and an ethylene content that is less than 10 wt % ethylene, or less than 9.0 wt % ethylene, or less than 8 wt % ethylene, or less than 7 wt % ethylene, or less than 6 wt % ethylene, or less than 5 wt % ethylene, where the percentage by weight is based upon the total weight of the propylene-derived and ethylene derived units of the second polymer component. In such embodiments, the PBP may comprise from 3-25 wt % of the second polymer component, or from 5-20 wt % of the second polymer component, or from 7-18 wt % of the second polymer component, or from 10-15 wt % of the second polymer component, and from 75-97 wt % of the first polymer component, or from 80-95 wt % of the first polymer component, or from 82-93 wt % of the first polymer component, or from 85-90 wt % of the first polymer component, based on the weight of the PBP, where desirable ranges may include ranges from any lower limit to any upper limit.

Polymerization of the PBP can be conducted by reacting monomers in the presence of a catalyst system described herein at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used. Further description of exemplary methods suitable for preparation of the PBPs described herein may be found in U.S. Pat. Nos. 6,881,800; 7,803,876; 8,013,069; and 8,026,323.

The PBPs described herein are prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Such catalyst systems may optionally include impurity scavengers.

The catalyst systems used for producing the PBP may comprise a metallocene compound. In some embodiments, the metallocene compound is a bridged bisindenyl metallocene having the general formula $(In^1)Y(In^2)MX_2$, where $In^1$ and $In^2$ are (preferably identical) substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In^1$ and $In^2$ are substituted by one or more substituents, the substituents are selected from the group consisting of a halogen atom, $C_1$-$C_{10}$ alkyl, $C_5$-$C_{15}$ aryl, $C_6$-$C_{25}$ alkylaryl, and N- or P-containing alkyl or aryl. Exemplary metallocene compounds include, but are not limited to, µ-dimethylsilylbis(indenyl)hafniumdimethyl and µ-dimethylsilylbis (indenyl)zirconiumdimethyl, and in particular (µ-dimethylsilyl)bis(2-methyl-4-(3,'5'-di-tert-butylphenyl)indenyl) zirconiumdimethyl, (µ-dimethyl-silyl)bis(2-methyl-4-(3,'5'-di-tert-butylphenyl)indenyl)hafniumdimethyl, (µ-dimethylsilyl)bis(2-methyl-4-naphthylindenyl)zirconiumdimethyl, (µ-dimethylsilyl)bis(2-methyl-4-naphthylindenyl)hafniumdimethyl, (µ-dimethylsilyl)bis(2-methyl-4-(N-carbazyl)indenyl)-zirconiumdimethyl, and (µ-dimethylsilyl)bis(2-methyl-4-(N-carbazyl)indenyl)-hafniumdimethyl.

Alternatively, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)-hafnium dimethyl, diphenylsilyl bis (5,5,8,8-tetramethyl-5,6,7,8-tetrahydrobenz(f)indenyl)-hafnium dimethyl, diphenylsilyl bis(2-(methyl)-5,5,8,8-tetramethyl-5,6,7,8-tetrahydrobenz(f) indenyl)zirconium dichloride, and cyclo-propylsilyl bis(2-(methyl)-5,5,8,8-tetramethyl-5,6,7,8-tetrahydrobenz(f) indenyl)hafnium dimethyl.

The activators of the catalyst systems used to produce PBP may comprise a cationic component. In some embodiments, the cationic component has the formula $[R^1R^2R^3AH]^+$, where A is nitrogen, $R^1$ and $R^2$ are together a —$(CH_2)_a$— group, where a is 3, 4, 5, or 6, and form, together with the nitrogen atom, a 4-, 5-, 6-, or 7-membered non-aromatic ring to which, via adjacent ring carbon atoms, optionally, one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. In other embodiments, the cationic component has the formula $[R_nAH]^+$, where A is nitrogen, n is 2 or 3, and all R are identical and are $C_1$ to $C_3$ alkyl groups, such as, for example, trimethylammonium, trimethylanilinium, triethylammonium, dimethylanilinium, or dimethylammonium.

In one or more embodiments, the activators of the catalyst systems used to produce the propylene-based polymer comprise an anionic component, $[Y]^-$. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl, and perfluorobiphenyl.

Together, the cationic and anionic components of the catalysts systems described herein form an activator compound. In one or more embodiments of the present invention, the activator may be N,N-dimethylanilinium-tetra(perfluorophenyl)borate, N,N-dimethylanilinium-tetra (perfluoronaphthyl)borate, N,N-dimethylanilinium-tetrakis (perfluoro-biphenyl)borate, N,N-dimethylanilinium-tetrakis (3,5-bis(trifluoromethyl)phenyl)borate, triphenylcarbenium-tetra(perfluorophenyl)borate, triphenylcarbenium-tetra (perfluoro-naphthyl)borate, triphenylcarbenium-tetrakis (perfluorobiphenyl)borate, or triphenylcarbenium-tetrakis(3, 5-bis(trifluoromethyl)phenyl)borate.

Any catalyst system resulting from any combination of a metallocene compound, a cationic activator component, and an anionic activator component mentioned in the preceding paragraphs shall be considered to be explicitly disclosed herein and may be used in accordance with the present invention in the polymerization of one or more olefin monomers. Also, combinations of two different activators can be used with the same or different metallocene(s).

Further, the catalyst systems may contain, in addition to the transition metal compound and the activator described above, additional activators (co-activators) and/or scavengers. A co-activator is a compound capable of reacting with the transition metal complex, such that when used in combination with an activator, an active catalyst is formed. Co-activators include alumoxanes and aluminum alkyls. Alumoxane may be modified to provide solubility in linear alkanes or be used in a slurry but is generally used from solution dissolving in a solvent. Typical solvents comprise aromatic compounds such as benzene, toluene, ethylbenzene, xylene, and alkanes such as hexane, octane, cyclohexane etc. Such solutions may include unreacted trialkyl aluminum and the alumoxane concentration is generally indicated as mol Al per liter, which figure includes any trialkyl aluminum which has not reacted to form an oligomer. The alumoxane, when used as cocatalyst, is generally used in molar excess, at a mol ratio of 50 or more, preferably 100 or more, and preferably 1000 or less, preferably 500 or less, relative to the transition metal.

Preparation of PBPs can be described in U.S. Pat. Nos. 6,881,800; 7,163,989; 6,992,160; 7,056,993; 7,084,218; and 7,601,666, contents of which are incorporated herein by reference.

In one or more embodiments the PBP can be homopolypropylene (hPP) or polypropylene impact copolymers ("ICP"). ICPs are blends comprising at least two components, i.e., polypropylene component ("Component A") and an elastomeric/rubber-like component ("Component B") and being substantially thermoplastic and having a high impact resistance.

In one or more embodiments, Component A is a propylene homopolymer, and preferably an isotactic propylene homopolymer, and small amounts of a comonomer may be used to obtain particular properties. In the same or other embodiments, Component B is a copolymer comprising propylene-derived units and comonomer-derived units. The comonomer is preferably ethylene, although other propylene copolymers or terpolymers may be suitable depending on the particular product properties desired. For example propylene/butene, hexene, or octene copolymers may be used.

In one or more embodiments, Component B comprises from about 30 to about 80 wt % propylene, or from about 35 to about 70 wt % propylene, or from about 40 to about 65 wt % propylene, or from about 60 to about 80 wt %. In the same or different embodiments, Component B comprises from about 20 to about 80 wt % comonomer, or from about 25 to about 75 wt % comonomer, or from about 30 to about 70 wt % comonomer, or from about 35 to about 65 wt % comonomer, or from about 40 to about 60 wt % comonomer, or from about 45 to about 55 wt % comonomers, or from about 20 to about 45 wt % comonomer. In certain embodiments, Component B may consist essentially of, or consist only of, propylene and ethylene-derived units in the above described amounts.

The ICPs may comprise from about 40 to about 95 wt % Component A and from about 5 to about 60 wt % Component B; or from about 50 to about 90 wt % Component A and from about 10 to about 50 wt % Component B' or from about 60 to about 90 wt % Component A and from about 10 to about 40 wt % Component B; or from about 70 to about 85 wt % Component A and from about 15 to about 30 wt % Component B; where desirable ranges may include ranges from any of the above described lower limits to any upper limit. In some embodiments, the ICP may consist essentially of Components A and B.

The overall comonomer (e.g., ethylene) content of the ICP may be in the range of from about 3 to about 40 wt %, or from about 5 to about 25 wt %, or from about 6 to about 20 wt %, or from about 7 to about 15 wt %, where desirable ranges may include ranges from any lower limit to any upper limit.

The melt flow rate ("MFR") of the ICPs suitable for use herein may range from about 1 to about 1000 g/10 min, or from about 1 to about 500 g/10 min, or from about 1 to about 50 g/10 min, or from about 1 to about 25 g/10 min, or from about 1 to about 20 g/10 min, or from about 1 to 10 g/10 min, where desirable ranges may include ranges from any lower limit to any upper limit. The MFR may be determined by ASTM-1238 measured at load of 2.16 kg and 230° C. In some preferred embodiment, the MFR of the ICPs can be not higher than 10 g/10 min.

The ICPs suitable for use in the compositions of the present invention may, in some embodiments, be reactor blends, meaning that Components A and B are not physically or mechanically blended together after polymerization but are interpolymerized in at least one reactor, often in two or more reactors in series.

The ICPs suitable for use in the present invention may be produced in reactors operated in series. In such series operations, the first polymerization (polymerization of Component A) may be a liquid slurry or solution polymerization process, and the second polymerization (polymerization of Component B) may be carried out in the gas phase. In one or more embodiments, hydrogen may be added to one or both reactors to control molecular weight, IV, and/or MFR. The use of hydrogen for such purposes is well known to those skilled in the art. Metallocene-based catalyst systems may also be used to produce the ICP compositions described herein. Current particularly suitable metallocenes are those in the generic class of bridged, substituted bis(cyclopentadienyl) metallocenes, specifically bridged, substituted bis (indenyl) metallocenes known to produce high molecular weight, high melting, highly isotactic propylene polymers. Generally speaking, those of the generic class disclosed in U.S. Pat. No. 5,770,753 are suitable.

Ethylene-Based Polymer ("EBP")

Useful polymer of the present compositions may comprise an ethylene-based polymer ("EBP"). In one or more embodiments, EBPs may comprise at least about 50 wt %, or from about 60 to about 99 wt %, or from about 65 to about 95 wt %, or from about 70 to about 90 wt % ethylene-derived units, and less than about 50 wt %, or from about 1 to about 40 wt %, or from about 5 to about 35 wt %, or from about 10 to about 30 wt % units derived from at least one of $C_3$-$C_{20}$ α-olefin comonomers, preferably $C_3$-$C_{10}$ α-olefins, and more preferably $C_4$-$C_8$ α-olefins, based on the weight of the EBP. The α-olefin comonomer may be linear, branched, cyclic and/or substituted, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene, and mixtures thereof.

In some embodiments, the EBPs may have the weight average molecular weight (Mw) of from about 15,000 to about 400,000 g/mol, from about 20,000 to about 250,000 g/mol, from about 20,000 to about 200,000 g/mol, from about 25,000 to about 150,000 g/mol, from about 150,000 to about 400,000 g/mol, from about 200,000 to about 400,000 g/mol, or from about 250,000 to about 350,000 g/mol.

In one or more embodiments, the EBPs may have a molecular weight distribution (MWD) or (Mw/Mn) of from about 1.5 to about 5.0, from about 2.0 to about 4.0, from about 3.0 to about 4.0, or from about 2.5 to about 4.0.

In one or more embodiments, the EBPs may have a density in accordance with ASTM D-4703 and ASTM D-1505/ISO 1183 of from about 0.905 to less than about 0.945 g/cm$^3$, or from about 0.910 to less than about 0.940 g/cm$^3$, or from about 0.910 to about 0.935 g/cm$^3$, or from about 0.910 to about 0.930 g/cm$^3$, or from about 0.910 to about 0.925 g/cm$^3$. In these embodiments the EBPs can be low density polyethylene (LDPE) and linear low density polyethylene (LLDPE).

Materials and processes for making EBPs can be referred to, for example, U.S. Pat. Nos. 6,956,088; 5,466,649; 6,476,171; 6,225,426; 6,242,545; 6,248,845; U.S. Patent Application Publication Nos. 2009/0297810; 2015/0291748; and PCT Publication No. WO 2014/099356. While the polymerization processes are described therein, certain features are reproduced here for convenience.

EBPs suitable for the present composition can be polymerized in the presence of a catalyst in a supported form, for example deposited on, bonded to, contacted with, or incorporated within, adsorbed or absorbed in, or on, a support or carrier. The metallocene catalyst may be introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

A slurry polymerization process generally uses pressures in the range of 1 to 50 atmospheres and even greater and temperatures in the range of from 0 to 200° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, ethylbenzene, or xylene. The medium employed should be liquid under the conditions of polymerization and relatively inert. Hexane or isobutane medium may be employed.

The EBPs useful in the present compositions can also comprise a wide variety of polymer types and molecular weights. Generally speaking the EBPs may preferably contain from 5 to 40 mol % of comonomer to vary crystallinity and flexibility. The comonomers may be α-olefins (under which term cyclic olefins such as styrene are included) having from 2 to 20 carbon atoms, such as ethylene (in the case of the polymer consisting predominantly of propylene derived units) 1-butene, 1-hexene, 1-octene. Amounts of dienes such as hexadiene, vinyl norbornene, ethylidene norbornene (ENB), norbornadiene, etc., may be included to promote unsaturation and/or the formation of longer branches themselves made from polymerized monomer derived units. Process of preparation can be referred to U.S. Pat. No. 8,425,847, contents of which are incorporated into this disclosure by reference.

In the case of plastomer, the EBPs may include the following aspects: preferably, the comonomer is an α-olefin having from 3 to 15 carbon atoms, more preferably 4 to 12 carbon atoms and more preferably 4 to 10 carbon atoms. Ethylene can be polymerized with at least two comonomers to form a terpolymer. Monomer is generally polymerized in a proportion of 70.0-99.99, preferably 70-90 and more preferably 80-95 or 90-95 mol % of ethylene with 0.01-30, preferably 3-30 and more preferably 5-20 mol % comonomer. For the purposes of this patent specification, the molecular weight distribution of a polymer can be determined with a Waters Gel Permeation Chromatograph equipped with Ultra-styrogel 5 columns and a refractive index detector. The operating temperature of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.10. The molecular weight distribution of the plastomers produced in this embodiment are termed "narrow" that is to say an $M_w/M_n$ less than 3, preferably less than or equal to 2.5. The MI of the polymers are generally in the range of 0.01 dg/min to 200 dg/min, preferably 0.1 dg/min to 100 dg/min, more preferably 0.2 to 50 dg/min and more preferably less than 10 dg/min. Contemplated densities of the plastomers are in the range of 0.85 to 0.93 g/cm³, preferably 0.87 to 0.92 g/cm³, and more preferably 0.88 to 0.91 g/cm³.

In the case of elastomers, the EBPs may include terpolymers of an Ethylene-α-Olefin-Diene Elastomer (EODE) of high $M_w$ and greater than 0.3 wt % diene content, preferably greater than 2.0 wt % diene content. These polymers may be largely amorphous and have a low or zero heat of fusion. As used herein the term "EODE" encompasses elastomeric polymers comprised of ethylene, an α-olefin, and one or more non-conjugated diene monomers. The non-conjugated diene monomer may be a straight chain, branched chain or cyclic hydrocarbon diene having from 6 to 15 carbon atoms. Examples of suitable non-conjugated dienes are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,4-cyclohexadiene; and 1,5-cyclododecadiene; and multi-ring alicyclic fused and bridged ring dienes such as tetrahydroindene, methyl tetrahydroindene, dicyclopentadiene; bicyclo-1,5-(2,2,1)-hepta-2,5-diene; alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Of the dienes typically used to prepare EPDMs, the particularly preferred dienes are, 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). The preferred EOD elastomers may contain 20 to 90 wt % ethylene, more preferably 30 to 85 wt % ethylene, and more preferably 35 to 80 wt % ethylene. The α-olefin suitable for use in the preparation of elastomers with ethylene and dienes are preferably propylene, 1-butene, 1-pentene, 1-hexene, 1-octene and 1-dodecene. The α-olefin is generally incorporated into the EODE polymer at 10 to 80 wt %, more preferably at 20 to 65 wt %. The non-conjugated dienes are generally incorporated into the EODE at 0.5 to 20 to 35 wt %; more preferably at 1 to 15 wt %, and more preferably at 2 to 12 wt %. If desired, more than one diene may be incorporated simultaneously, for example HD and ENB, with total diene incorporation within the limits specified above.

The elastomers may also be devoid of a diene and be a copolymer of two monomer types. Such copolymers may be elastomers of high $M_w$, low crystallinity, and low ash. The copolymers may be ethylene-α-olefin copolymers (EPC) of high $M_w$. As used herein the term "EPC" means a copolymer of ethylene and an α-olefin, not necessarily propylene, which exhibits the properties of an elastomer. The α-olefins suitable for use in the preparation of elastomers with ethylene are preferably $C_3$-$C_{10}$ α-olefins. Illustrative non-limiting examples of such α-olefins are propylene, 1-butene, 1-pentene, 1-hexene, 1-octene and 1-dodecene. If desired, more than one α-olefins may be incorporated. The EPC elastomers may contain 20 to 90 wt % ethylene, more preferably 30 to 85 wt % ethylene, and more preferably 35 to 80 wt % ethylene.

Molecular Sieves

Molecular sieves that can be used in the practice of the present invention can have a pore size from about 5 Angstroms to about 7 Angstroms and include for example, AEL, MFI, MFS, MEL, MTW, EUO, MTT, HEU, FER, OFF, or TON framework type zeolites (IUPAC Commission of Zeolite Nomenclature). The useful molecular sieve also comprises other framework type zeolites inter-grown with any one of the above mentioned framework type zeolite. The pore diameter (also sometimes referred to as effective pore diameter) can be measured using standard adsorption techniques and hydrocarbonaceous compounds of known minimum kinetic diameters. See Breck, Zeolite Molecular Sieves, 1974 and Anderson et al., J. Catalysis 58, 114 (1979), both of which are incorporated herein by reference.

In one or more embodiments, the molecular sieve has a silica to alumina molar ratio of less than about 150, or less than about 120, or less than about 100, or less than about 80, or less than about 50, or less than about 35.

Preferably, the molecular sieve is in the form of fine, small, dispersible particles, their agglomerates, or processed into pellets. Generally the dispersed particle size is in the range of 1-100 μm and more preferably the zeolite has a particle size below 50 μm.

Non-limiting examples of such zeolites, include ZSM-5, ZSM-11, ZSM-12, ZSM-22, ZSM-23, ZSM-34, ZSM-35, ZSM-38, ZSM-48, ZSM-50, silicalite, and silicalite 2. The most preferred is ZSM-5, which is described in U.S. Pat. Nos. 3,702,886 and 3,770,614. ZSM-11 is described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. All of the above patents are incorporated herein by reference. Other suitable zeolites include the silicoaluminophosphates (SAPO), such as SAPO-4 and SAPO-11 which is described in U.S. Pat. No. 4,440,871; chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651; and iron aluminosilicates.

Compositions

The present compositions may comprise greater than about 0.5 wt %, or greater than about 1 wt %, or greater than about 1.5 wt %, or greater than about 2 wt %, or greater than about 3 wt %, or greater than about 5 wt % molecular sieves, based on the weight of the polymer and the molecular sieve. The upper limit is not particularly restricted as long as properties of an article made from such compositions do not deteriorated significantly. Generally speaking, the compositions may comprise less than about 25 wt %, or less than about 20 wt %, or less than about 18 wt %, or less than about 15 wt %, or less than about 13 wt % molecular sieve, based on the weight of the polymer and the molecular sieve. In preferred embodiments, the compositions can comprise from about 0.5 to about 20 wt % or from about 0.5 to about 15 wt %, or from 1 to about 15 wt %, or from 1.5 to about 15 wt %, or from about 5 to about 15 wt % molecular sieve, based on the weight of the polymer and the molecular sieve.

The present compositions may comprises less than about 99.5 wt %, or less than about 99 wt %, or less than about 98.5 wt %, or less than about 98 wt %, or less than about 97 wt %, or less than about 95 wt % the polymer, based on the weight of the polymer and the molecular sieve. In the same or other embodiments, the present compositions may comprise greater than about 75 wt %, or greater than about 80 wt %, or greater than about 82 wt %, or greater than about 85 wt %, or greater than about 87 wt % the polymer, based on the weight of the polymer and the molecular sieve. In preferred embodiments, the compositions can comprise from about 80 to about 99.5 wt % or from about 85 to about 99.5 wt %, or from 85 to about 99 wt %, or from 85 to about 98.5 wt %, or from about 85 to about 95 wt % the polymer, based on the weight of the polymer and the molecular sieve.

A variety of additives may be incorporated into the polymer compositions described herein, depending upon the intended purpose. For example, when the compositions are used to form fibers and nonwoven fabrics, such additives may include but are not limited to, stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. Primary and secondary antioxidants include, for example, hindered phenols, hindered amines, and phosphates. Nucleating agents include, for example, sodium benzoate and talc. Also, to improve crystallization rates, other nucleating agents may also be employed such as Ziegler-Natta olefin products or other highly crystalline polymers. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

Further, in some exemplary embodiments, additives may be incorporated into the present compositions directly or as part of a masterbatch, i.e., an additive package containing several additives to be added at one time in predetermined proportions. In one or more embodiments herein, the fiber of the present invention further comprise a masterbatch comprising a slip agent. The masterbatch may be added in any suitable amount to accomplish the desired result. For example, a masterbatch comprising a slip additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the composition. In an embodiment, the masterbatch comprises erucamide as the slip additive.

The present compositions can be made by any known method. Mixing techniques common in the art are useful, such as the use of a Brabender or Banbury mixer, or a screw-type extruder, or other suitable blender. In one or more embodiments, the molecular sieve can be added upstream of the pelletizing extruder of the polymer production line to form polymer composition pellets comprising the polymer and the molecular sieve. Alternatively, the molecular sieve can be added in a compounding step after production of the polymer, or by the converter in a blending process prior to fabricating the end product. In some embodiments, the molecular sieve can be added at the time of melt blending. Alternatively, the molecular sieves can be pre-blended with other component, if applicable, and then blended with the polymer. The molecular sieve can be added in form of fine powders or their aggregated dispersible particles.

The compositions of the present invention can have reduced content(s) of toluene, $C_6$-$C_{16}$ volatile organic compounds, and/or $C_1$-$C_{16}$ volatile organic compounds, in particular benzene, toluene, ethylbenzene, xylene, styrene, formaldehyde, acetaldehyde, and acrolein, compared to corresponding reference contents contained in a reference composition that is the same as the present composition but substantially free of the molecular sieve.

In some embodiments, the compositions of the present invention may have a $C_6$-$C_{16}$ volatile organic compound content of less than about 3.0 mg/m$^3$, or less than about 2.5 mg/m$^3$, or less than about 2.0 mg/m$^3$, or less than about 1.5 mg/m$^3$, or less than about 1.0 mg/m$^3$, and/or is at least about 25%, or about 30%, or about 40%, or about 50%, or about 70%, or about 75%, or about 80% less than a reference $C_6$-$C_{16}$ volatile organic compound content contained in a reference composition that is the same as the present composition but substantially free of the molecular sieve.

In the same or other embodiments, the compositions of the present invention may have a $C_1$-$C_{16}$ volatile organic compounds content of less than about 3.0 mg/m$^3$, or less than about 2.5 mg/m$^3$, or less than about 2.0 mg/m$^3$, or less than about 1.5 mg/m$^3$ and/or is at least about 25%, or about 30%, or about 40%, or about 50%, or about 70%, or about 75%, or about 80% less than a reference $C_1$-$C_{16}$ volatile organic compound content contained in a reference composition that is the same as the composition but substantially free of the molecular sieve.

In the same or other embodiments, the compositions of the present invention may have a toluene content of less than about 1.0 mg/m$^3$; or less than about 0.5 mg/m$^3$, or less than about 0.1 mg/m$^3$, or less than about 0.08 mg/m$^3$, or less than about 0.05 mg/m$^3$, and/or is at least about 50%, or about 75%, or about 80%, or about 85%, or about 88%, or about 90%, or about 95% less than a reference toluene content contained in a reference composition that is the same as the composition but substantially free of the molecular sieve.

In the same or other embodiments, the compositions of the present invention may comprise a cumulative content of benzene, toluene, xylene, ethylbenzene, and styrene of less than about 0.2 mg/m$^3$, or less than about 0.15 mg/m$^3$. In the same or other embodiments, the polymer compositions may comprises a cumulative content of formaldehyde, acetaldehyde and acrolein of less than about 0.15 mg/m$^3$, or less than about 0.1 mg/m$^3$. In the same or other embodiments, the compositions may comprises a cumulative content of benzene, toluene, xylene, ethylbenzene, styrene, formaldehyde, acetaldehyde and acrolein of less than about 0.35 mg/m$^3$, or less than about 0.2 mg/m$^3$.

INDUSTRIAL APPLICATIONS

The present compositions can be used in various applications as a low emitting material, for example, in building material such as adhesives and consumer products such as printers, appliances and furniture, and in particular individual parts or articles for use in a closed/confined spaces such as offices, rooms, and compartments of transportation tools such as vehicles, trains, airplanes, ships. In some embodiments, the polymer compositions can be used in preparation of interior components of transportation tools, for example, carpets, carpet tile backing, heavy layer mat, grip, sealing strip, grates, dashboard parts, roof felting, and seats, as well as adhesives used in decorations.

Examples

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The following material were used in the Examples.

A propylene-ethylene copolymer ("PBP1") was prepared according to the method as described in U.S. Pat. No. 7,601,666, Example E8, Table 9a and Table 9b. The catalyst used was rac-Ph2Si(5,6,7,8-tetrahydro-2,5,5,8,8-pentamethyl-benz[f]indenyl)2HfMe2 as prepared in its example 2 dissolved in deoxygenated toluene. The propylene-ethylene copolymer comprised about 85 wt % propylene-derived units, had about 15 wt % ethylene-derived units and had a density of about 0.863 g/cm$^3$ as measured based on ASTM D1505, a melt index of about 9.0 g/10 min as measured based on ASTM D1238, a melting point of about 45° C., and an Hf of about 11.5 J/g.

Zeolite X molecular sieve 13XBF (FAU-type framework) was commercially available from BASF.

Molecular sieve ZSM-5 was a ZSM-5 (MFI-type framework), having a $SiO_2$/$Al_2O_3$ molar ratio of 48 and was commercially available from ExxonMobil Catalyst Technologies LLC, USA.

ZSM-5 molecular sieves Z30, Z50, having a $SiO_2$/$Al_2O_3$ molar ratio of 30 and 50, respectively, were commercially available from Shandong Qilu Huaxin Hi-Tech Co., Ltd., China.

ZSM-5 molecular sieve Z100, having a $SiO_2$/$Al_2O_3$ molar ratio of 100 was commercially available from Shandong Hongtai Hengrui New Material Co., Ltd., China.

Zeolite Y molecular sieve NaY, having an FAU-type framework, was commercially available from Shandong Qilu Huaxin Hi-Tech Co., Ltd., China.

$CaCO_3$ was commercially available from Omya Company under tradename Omyacarb® 2T grade.

The following test method was used in the present invention.

Contents of benzene, toluene, xylene, ethylbenzene, styrene, tetradecane and $C_6$-$C_{16}$ VOCs were measured using thermodesorption gas chromatography with mass spectrometric detection ("TDS-GC-MS") methods with the following conditions:

Sample Size: 10*10 cm
Capacity of bag used: 10 L
Amount of Nitrogen gas in the sealed bag: 5 L
Test Temperature: 65° C.
Test Time: 2 hours
Collection Capacity (TENAX): 1 L
Collection Rate (TENAX): 400 mL/min Contents of formaldehyde, acetaldehyde and acrolein were measured using high-performance liquid chromatography with diode-array detection ("HPLC-DAD") method with the following conditions:

Sample Size: 10*10 cm
Capacity of bag used: 10 L
Amount of Nitrogen gas in the sealed bag: 5 L
Test Temperature: 65° C.
Test Time: 2 hours
Collection Capacity (TENAX): 2 L
Collection Rate (TENAX): 800 mL/min The above TDS-GC-MS and HPLC-DAD detection in the following examples were conducted by Testing Center—Chemical Laboratory of SGS-CSTC Standards Technical Services (Shanghai) Co., Ltd., China.

Examples

PBP1 and molecular sieves/fillers are blended as the formulation shown in Table 1 in Brabender mixer, including steps of pre-heated the mixer at a temperature of 170° C., and calibrated before PBP1 was added into the chamber, and when the torque of molten polymer was stabilized, the molecular sieve/filler was then added and mixed by screws for 10 minutes, the resulting product was then collected for compression molding to prepare 10*10 cm plaque samples for measurement of VOCs contents. Among all the formulations, samples C1 and C5 that were not processed in Brabender mixer, but compression molded to the 10*10 plaque samples.

TABLE 1

Compositions of Samples

| Samples | | | Molecular Sieves/Filler (wt %) | | | | | | |
|---|---|---|---|---|---|---|---|---|---|
| # | Weight (g) | PBP1 (wt %) | CaCO3 | 13XBF | ZSM-5 | Z30 | Z50 | Z100 | NaY |
| C1 | 15.63 | 100 | | | | | | | |
| C2 | 15.67 | 100 | | | | | | | |
| C3 | 16.59 | 90 | 10 | | | | | | |
| C4 | 17.17 | 90 | | 10 | | | | | |
| 1 | 16.93 | 90 | | | 10 | | | | |
| C5 | | 100 | | | | | | | |
| C6 | | 90 | | 10 | | | | | |
| 2 | | 90 | | | | 10 | | | |
| 3 | | 90 | | | | | 10 | | |
| 4 | | 90 | | | | | | 10 | |
| 5 | | 90 | | | | | | 10 | |
| C7 | | 90 | | | | | | | 10 |
| C8 | | 90 | | | | | | | 10 |

Test results of VOCs contents are shown in Table 2.

TABLE 2

VOCs Contents Test Results

| | VOCs Contents ($\mu g/m^3$) | | | | | | | | |
|---|---|---|---|---|---|---|---|---|---|
| Sample # | Benzene | Toluene | Ethylbenzene | Xylene | Styrene | $C_6$-$C_{16}$ VOCs | formaldehyde | acetaldehyde | acroleine |
| C1 | ND* | 276 | 36 | 121 | ND* | 3214 | ND** | ND** | ND** |
| C2 | ND* | 69 | 13 | 34 | ND* | 3074 | ND** | ND** | ND** |
| C3 | ND* | 78 | 24 | 71 | ND* | 4243 | ND** | ND** | ND** |
| C4 | 11 | 122 | 24 | 68 | ND* | 5436 | ND** | 920 | ND** |
| 1 | ND* | 22 | ND* | ND* | ND* | 2199 | ND** | ND** | ND** |
| C5 | ND* | 712 | ND* | ND* | ND* | 3881 | ND** | ND** | ND** |
| C6 | ND* | 591 | 11 | 34 | ND* | 3493 | ND** | ND** | ND** |
| 2 | ND* | 35 | ND* | 64 | ND* | 942 | ND** | ND** | ND** |
| 3 | 10 | 65 | ND* | 64 | ND* | 1913 | ND** | ND** | ND** |
| 4 | ND* | 55 | ND* | 48 | ND* | 1210 | ND** | ND** | ND** |
| 5 | ND* | 50 | ND* | 66 | ND* | 2335 | ND** | ND** | ND** |
| C7 | ND* | 424 | 17 | 59 | ND* | 2930 | ND** | 235 | ND** |
| C8 | ND* | 400 | 15 | 58 | ND* | 2875 | ND** | 260 | ND** |

ND*: not detectable, because the content is lower than the test limit (10 $\mu g/m^3$)
ND**: not detectable, because the content is lower than the test limit (50 $\mu g/m^3$)

It can be seen from the above Tables that samples 1 to 5, which used molecular sieves having MFI-type framework contain significantly reduced amount of VOCs compared to comparative samples C1 to C8, which were not blended with molecular sieves or were blended with molecular sieves having FAU-type framework.

It can also been seen that when blending with molecular sieves having $SiO_2/Al_2O_3 < 50$, such as Sample 2 (molar ratio of 30), the toluene content was reduced by 95%, and $C_6$-$C_{16}$ content was reduced by 76%, as compared to samples C5, which included a molecular sieve having a higher $SiO_2/Al_2O_3$ molar ratio (i.e. >50).

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A composition comprising:
   a polymer; and
   a molecular sieve having a framework type of AEL, MFI, MFS, MEL, MTW, EUO, MTT, HEU, FER, OFF, or TON,
   wherein the composition comprises a toluene content of less than 1.0 mg/m$^3$, and
   wherein the polymer composition comprises a $C_6$-$C_{16}$ volatile organic compounds content of less than 3.0 mg/m$^3$, and
   wherein each of the toluene content and the $C_6$-$C_{16}$ volatile organic compound content is measured by thermodesorption gas chromatography with mass spectrometric detection method, and
   wherein the toluene content is at least 50% lower than a reference toluene content contained in a reference composition, wherein the reference polymer composition is the same as the composition but substantially free of the molecular sieve.

2. The composition of claim 1, wherein the toluene content is less than 0.1 mg/m$^3$.

3. The composition of claim 1, wherein the $C_6$-$C_{16}$ volatile organic compounds content is less than 2.5 mg/m$^3$.

4. The composition of claim 1 comprising from 0.5 to 20 wt % the molecular sieve based on the weight of the polymer composition.

5. The composition of claim 1 comprising from 1.5 to 15 wt % the molecular sieve based on the weight of the polymer composition.

6. The composition of claim 1 comprising a cumulative content of benzene, toluene, xylene, ethylbenzene, and styrene of less than 0.2 mg/m$^3$, as measured by high-performance liquid chromatography with diode-array detection method.

7. The composition of claim 1, wherein the polymer composition comprises a cumulative content of formaldehyde, acetaldehyde, and acrolein of less than 0.15 mg/m$^3$.

8. The composition of claim 1, wherein the polymer composition comprises a cumulative content of benzene, toluene, xylene, ethylbenzene, styrene, formaldehyde, acetaldehyde, and acrolein of less than 0.35 mg/m$^3$.

9. The composition of claim 1, wherein the molecular sieve comprises at least one of ZSM-5, ZSM-12, ZSM-22, ZSM-23, ZSM-34, ZSM-35, ZSM-38, ZSM-48, and ZSM-50.

10. The composition of claim 1, wherein the molecular sieve comprises ZSM-5.

11. The composition of claim 1, wherein the molecular sieve has a SiO$_2$/Al$_2$O$_3$ molar ratio of less than 150.

12. The composition of claim 1, wherein the molecular sieve has a SiO2/Al$_2$O$_3$ molar ratio of less than 50.

13. The composition of claim 1, wherein the polymer is prepared in the presence of a metallocene catalyst dissolved in an aromatic solvent.

14. The composition of claim 13, wherein the aromatic solvent comprises at least one of benzene, toluene, ethylbenzene, xylene, and styrene.

15. The composition of claim 1, wherein the polymer is a copolymer of propylene or ethylene and at least one of ethylene and $C_3$-$C_{12}$ alpha olefins and comprising at least 60 wt % of propylene-derived units or ethylene-derived units.

16. The composition of claim 1, wherein the polymer is a propylene-ethylene copolymer, propylene-butene copolymer, propylene-hexene copolymer, ethylene-butene copolymer, ethylene-hexene copolymer, or ethylene-octene copolymer.

17. The composition of claim 1, wherein the polymer is a copolymer comprising at least 70 wt % propylene-derived units and from 3 to 25 wt % ethylene-derived units and has a melting temperature measured by DSC of less than 120° C., a heat of fusion of less than 80 J/g, and a mmm propylene triad tacticity measured by $^{13}$C NMR of less than 75%.

18. An article comprising the polymer composition of claim 1.

19. A method of reducing toluene content contained in a composition comprising a polymer, comprising: blending the composition with a molecular sieve having a framework type of AEL, MFI, MFS, MEL, MTW, EUO, MTT, HEU, FER, OFF, or TON to form a blended composition, wherein the toluene content of the blended composition is at least 50% less than a reference toluene content of the composition, wherein the composition is the same as the blended composition but substantially free of molecular sleeve, wherein the toluene content and the reference toluene content are determined by thermodesorption gas chromatography with mass spectrometric detection method.

20. The method of claim 19, wherein the toluene content is at least 80% less than the reference toluene content.

21. The method of claim 19, wherein the $C_6$-$C_{16}$ volatile organic compound content of the blended composition is at least 50 wt % less than a reference $C_6$-$C_{16}$ volatile organic compound content of the composition, wherein the $C_6$-$C_{16}$ volatile organic compound content and the reference $C_6$-$C_{16}$ volatile organic compound content are determined by thermodesorption gas chromatography with mass spectrometric detection method.

22. The method of claim 19, wherein the toluene content is less than about 0.1 mg/m$^3$.

23. The method of claim 19, wherein the blended composition comprises a $C_6$-$C_{16}$ volatile organic compounds of less than about 2.5 mg/m$^3$.

24. The method of claim 19, wherein the molecular sieve comprise a ZSM-5 molecular sieve having a SiO$_2$/Al$_2$O$_3$ molar ratio of less than 150.

* * * * *